US005737032A

United States Patent [19]
Stenzel et al.

[11] Patent Number: 5,737,032
[45] Date of Patent: Apr. 7, 1998

[54] SERIAL DIGITAL VIDEO PROCESSING WITH CONCURRENT ADJUSTMENT IN RGB AND LUMINANCE/COLOR DIFFERENCE

[75] Inventors: Robert E. Stenzel, Phoenixville; Donald E. Groff, Hatfield, both of Pa.

[73] Assignee: Videotek, Inc., Pottstown, Pa.

[21] Appl. No.: 523,269

[22] Filed: Sep. 5, 1995

[51] Int. Cl.$^6$ ................................................ H04N 9/64
[52] U.S. Cl. .................................... 348/649; 348/651
[58] Field of Search ...................... 348/651, 649, 348/30, 453, 656, 208, 441; 382/162, 167; 395/131; 345/154

[56] References Cited

U.S. PATENT DOCUMENTS

| | | | |
|---|---|---|---|
| 4,352,123 | 9/1982 | Flamm | 358/23 |
| 4,500,919 | 2/1985 | Schreiber | 358/78 |
| 5,265,200 | 11/1993 | Edgar | 395/131 |
| 5,303,064 | 4/1994 | Johnson et al. | 358/406 |
| 5,317,426 | 5/1994 | Hoshino | 358/515 |
| 5,373,327 | 12/1994 | McGee et al. | 348/645 |
| 5,377,024 | 12/1994 | Dillinger | 358/502 |
| 5,390,034 | 2/1995 | Murakami et al. | 358/518 |
| 5,450,500 | 9/1995 | Brett | 348/649 |

OTHER PUBLICATIONS

SMPTE 259M—Proposed SMPTE Standard for Television, pp. 2–7, Aug. '95.
CCIR Recommendation 656, pp. 105–117 1986.
CCIR Recommendation 656-1 Oct. 12–16, '93.
CCIR Recommendation 601-2, pp. 95–104 undated.

*Primary Examiner*—Victor R. Kostak
*Attorney, Agent, or Firm*—Eckert Seamans Cherin & Mellott

[57] ABSTRACT

A digital converter controllably modifies input video data representing pixel luminance and color information, in two color space formats. Two color space converters are coupled in cascade. Serial video data is converted to parallel and demultiplexed. A first color space converter converts 4:2:2 sampled YCbCr luminance and color difference input data to RGB red/green/blue format. A second color space converter changes the data back to YCbCr before remultiplexing at the output. Under operator control from front panel inputs, a controller varies the conversion coefficients at the input-side color space converter, including by trigonometric functions applied to the coefficients to provide controllable hue phase shifting, modifies the transfer function in RGB color space by adjusting data in the lookup tables, and applies maximum/minimum clipping levels. Interpolation doubles the sample rate of CbCr color difference data at the input for co-siting each Y sample with a CbCr color difference for processing samples at 4:4:4. Two's complement computations, including for luminance Y, employ the full dynamic quantization range of the color space converters. An auxiliary color space converter operates on divided coefficients for detecting overflow. A bypass delay route is provided for non-video data, and error detection and handling signals are passed through as well as compared and generated for the changed data.

15 Claims, 8 Drawing Sheets

SERIAL DIGITAL VIDEO PROCESSING WITH CONCURRENT ADJUSTMENT IN RGB AND LUMINANCE/COLOR DIFFERENCE

BACKGROUND OF THE INVENTION

1. Field of the Invention

The invention relates to the field of video signal processing, and in particular concerns a digital signal processor that converts a serial signal representing numeric samples of luminance and color difference (Y, Cb, Cr) to red-green-blue (RGB) color space, while applying variable scaling and threshold clipping as selected by a user, in order to adjust or correct characteristics of the signal in either or both of the color spaces. The invention is useful in connection with video production, for example to compensate for characteristics of the signal source, to correct modifications inserted by other video processing equipment or to achieve some desired result in the resulting picture such as to vary the scaling of luminance and/or color difference for particular frames or ranges of frames of video.

2. Prior Art

In the CCIR-601 4:2:2 format, video is represented by digitized samples of luminance and two color differences (Y, Cb and Cr, respectively). The luminance Y represents the weighted total of red, green and blue. Thus, the third color value can be derived from the three values to convert the video sample into RGB, which is done using known conversion factors. It may be desired to modify these luminance and color difference signals directly, or to modify the red, green, and blue signals to which the luminance and color difference signals may be transformed.

According to the CCIR-601 4:2:2 format, luminance is sampled at four times the subcarrier frequency and the two color differences are sampled at twice the subcarrier frequency, hence the designation 4:2:2. The sampling rates for luminance (13.5 MHz) and color difference (6.75 MHz) are compatible with 525 line frames at 60 Hz or 625 line frames at 50 Hz. The successive samples in order are Cb, Y, Cr, Y, Cb, Y, Cr, . . ., etc. According to proposed SMPTE standard 259M, each of the samples of luminance or color difference is ten bits. Eight bit digital video signal processing is also of course possible. An eight bit sample can quantize to one part in 256, or a ten bit sample to one part in 1024. However, certain data values are reserved for ancillary signalling purposes, or are outside of normal limits and provide margin space whereby signals may sometimes overshoot without causing registers to overflow or other circuits to be overdriven. The signals can be transmitted in a bit-serial pulse code modulation technique such as non-return to zero.

The digital luminance and color difference values (YCbCr) can be constructed from the primary analog signals $E'_R$, $E'_G$ and $E'_B$ according to CCIR-601 in three stages. Each of the values Y, Cb, Cr in luminance/color difference space is a function of all three primary analog values in the other color space, as factored, quantized and offset.

$$E'_Y = 0.299 * E'_R + 0.587 * E'_G + 0.114 * E'_B$$

$$(E'_R - E'_Y) = 0.701 * E'_R - 0.587 * E'_G - 0.114 * E'_B$$

$$(E'_B - E'_Y) = -0.299 * E'_R - 0.587 * E'_G + 0.886 * E'_B$$

The values for $E'_Y$ range between 1.0 and zero; $(E'_R - E'_Y)$ ranges between +0.701 and −0.701; and, $(E'_B - E'_Y)$ ranges between +0.886 and −0.886. To restore the signal excursion of the color difference signals to unity (+0.5 to −0.5), coefficients can be applied to the color differences as follows:

$$K_R = 0.5/0.701 = 0.713$$

$$K_B = 0.5/0.886 = 0.564$$

Then, $$E'_{Cr} = 0.713 * (E'_R - E'_Y) = 0.500 * E'_R - 0.419 * E'_G - 0.081 * E'_B;$$

and, $$E'_{Cb} = 0.564 * (E'_B - E'_Y) = -0.169 * E'_R - 0.331 * E'_G - 0.500 * E'_B,$$

where $E'_{Cr}$ and $E'_{Cb}$ are the re-normalized red and blue color difference signals, respectively, and have the same nominal peak-to-peak amplitude as the luminance signal $E'_Y$.

In the case of a uniformly quantized 8-bit binary encoding, $2^8$ or 256 equally spaced quantization levels are specified so that the range of binary numbers available is from 0000 0000 to 1111 1111 (or in hexadecimal, x'00 to x'FF), the decimal equivalent numbers being 0 to 255, inclusive. According to the CCIR-601 recommendation for 4:2:2 encoding, levels 0 and 255 are reserved for synchronization data. Levels 1 to 254 are available for video. The luminance signal is permitted to occupy only 220 levels, to provide working margins, and the black level is 16. The color difference signals are permitted to occupy 225 levels, with the level corresponding to zero being 128. Therefore, the decimal values of the luminance signal $\hat{Y}$ and the color difference signals $\hat{C}_B$, $\hat{C}_R$, prior to quantization are:

$$\hat{Y} = 219(E'_Y) + 16,$$

$$\hat{C}_B = 224[0.564 (E'_B - E'_Y)] + 128 = 126 (E'_B - E'_Y) + 128,$$

and, $$\hat{C}_R = 224[0.713 (E'_R - E'_Y)] + 128 = 160 (E'_R - E'_Y) + 128.$$

After quantization, the corresponding level is the nearest integer value, and the digital values are termed Y, Cb and Cr, respectively.

Although the transmission format as described is luminance and color difference, it may be desirable for various purposes to convert a video signal into separate levels applicable to each of the three colors: red, green and blue. Conversions between YCbCr and RGB color spaces are advantageously accomplished by digital computations. However, if one attempts to modify the data, for example when in YCbCr form, it is possible to produce an R, G and/or B value that is out of normal limits from a YCbCr value that is apparently valid, and vice versa. This is due to the inter-related nature of the variables, i.e., each variable in either color space is a function of all three variable in the other color space.

The resolution possible in a digital computations is a function of the level of quantization. Error detection bits can be included for word parity and record parity (cyclic redundancy checking), as well as ancillary signalling, for example as provided by proposed SMPTE Standard 259M. Thus, digital processing has a number of aspects and capabilities that are appropriate for the processing of video information. However, video encoded to an effective resolution has a high data rate, and requires complex signal processing arrangements. Moreover, data formatted according to standards such as CCIR-601 does not contain full sets of co-sited YCbCr values due to the different sampling frequencies used for luminance and color difference.

SUMMARY OF THE INVENTION

It is an object of the invention to provide a versatile video interface apparatus for controllably altering the characteristics of a digitally encoded video signal with respect to gain, color, offset, threshold limits and the like, relating to both luminance/color differences and RGB encoding of the video signal.

It is another object of the invention to improve the resolution of color space conversion between luminance/ color difference and RGB color space, with the capability of user control of characteristics of the video by manual adjustments to affect color space conversion factors.

It is also an object of the invention to permit a wide variety of adjustments to a digitally encoded video signal, including using nonlinear functions and combinations of functions.

It is a further object of the invention to provide a digital video interface that is transparent to auxiliary signalling and accommodates processing of previously inserted error detection and handling signals as well as processing of such signals with respect to altered video data.

It is another object of the invention to deal with overflow conditions that can arise with manipulation of the data as described.

These and other objects are accomplished by a serial digital converter or corrector for adjusting the values of an input video data signal representing pixel or sample information in a first color space format such as luminance and color differences. Two color space converters are coupled in cascade along a data path, one converting successive data values to a second color space format such as RGB, and the next converting back to the first color space. Value adjustment circuits perform a numeric function on the data values using coefficients and factors supplied by a controller under operator control. In particular, the controller varies the coefficients used by the input-side color space converter, modifies the results in RGB color space using lookup tables loaded by the controller, and applies maximum and/or minimum clipping levels that are provided by the controller and used to replace output luminance/color difference values that fall outside the clipping levels. The converter has an input serial to parallel converter and a demultiplexer converting bit serial data to bit parallel, word serial form, and interpolates color difference values to change 4:2:2 sampled luminance and color differences to 4:4:4 format so that each luminance value is processed with two co-sited color difference values. This data is applied to the first color space converter, which performs a matrix multiplication using the supplied coefficients, resulting in offset RGB data values that are controllable by the user by varying the coefficients. The computation is done all in two's complement form, thereby employing the full dynamic range of the matrix multiplication, but also increasing the offset introduced. The RGB values are used to address memory lookup tables. The controller varies the addressed contents of the lookup tables and thus adjusts the transfer function of the device, such that the operator can control the gain, gamma curve, offset and the like. The lookup tables include bits that flag values that are outside predetermined limits. The converted and corrected RGB values are provided to an output color space converter to change from RGB back to luminance and color difference by matrix multiplication using fixed coefficients. The luminance and color difference values are clipped if desired and an output parallel to serial converter and remultiplexer put the convened data back into bit serial form. A bypass path around the data conversion process having a delay equal to that of the data conversion process passes auxiliary signalling, time reference signalling and other non-video data to the output. Parity and cyclic redundancy checks are made for detecting errors in received data, and also are regenerated for the output data and inserted in the output so as to reflect the changes. Any error detection and handling codes found in the input data are passed through to the output.

Apart from applying the standard coefficients, according to the present invention a digital video signal is manipulated under user control in various ways. Computations and conversions can be adjusted, for example, to vary all or a portion of the transfer function or gamma curve to change the response of the digital video interface, i.e., to shift or change the slope or shape of the transfer function for changing the gain for a given combination of YCbCr or RGB. It may also be desirable to apply threshold cutoffs so that apparently illegal values are clipped at a predetermined value. Another desirable capability is to shift the hue phase angle.

According to the present invention, a serial digital signal is demultiplexed, converted between color spaces and scaled, shifted or clipped, then converted back to the initial color space and remultiplexed. This is accomplished while maintaining any auxiliary signals, error detection handling signals and other data included in the input signal, and generating new error checking codes that reflect the changed data. The characteristics of the signal are changed and the signal is reformatted with the changes. Additional error checks and features are provided to support status information and alarm capabilities, and to facilitate editing, for example by changing between coefficients at a particular frame count according to timing reference signals, which also are serviced.

These aspects are performed in a manner that prevents user controlled changes to the data from producing illegal values due to overflows, and/or flags values that do not meet selected limits. Accordingly, as described in the following discussion of practical embodiments, a practical and versatile device is provided for converting video in a manner useful to a program editor or engineer for technical or artistic reasons.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

The serial digital converter or interface according to the invention allows the user to modify various characteristics of a serial digital video signal having components or values encoded to represent luminance and color differences according to a given color space definition. The invention as illustrated is adapted for CCIR-601 format, the components of the signal including the luminance Y, color difference values Cb and Cr, and certain auxiliary non-video signals. The invention provides a pipeline data path in which data for successive pixels or samples are manipulated while converting between color space definitions in which the luminance and color differences of the samples are characterized. Brightness, gain, hue shift and gamma or transfer function corrections can be made in a variety of formats. Clips and stretches can be applied. Most of the corrections can be applied in RGB or YCbCr format.

Figure 1:
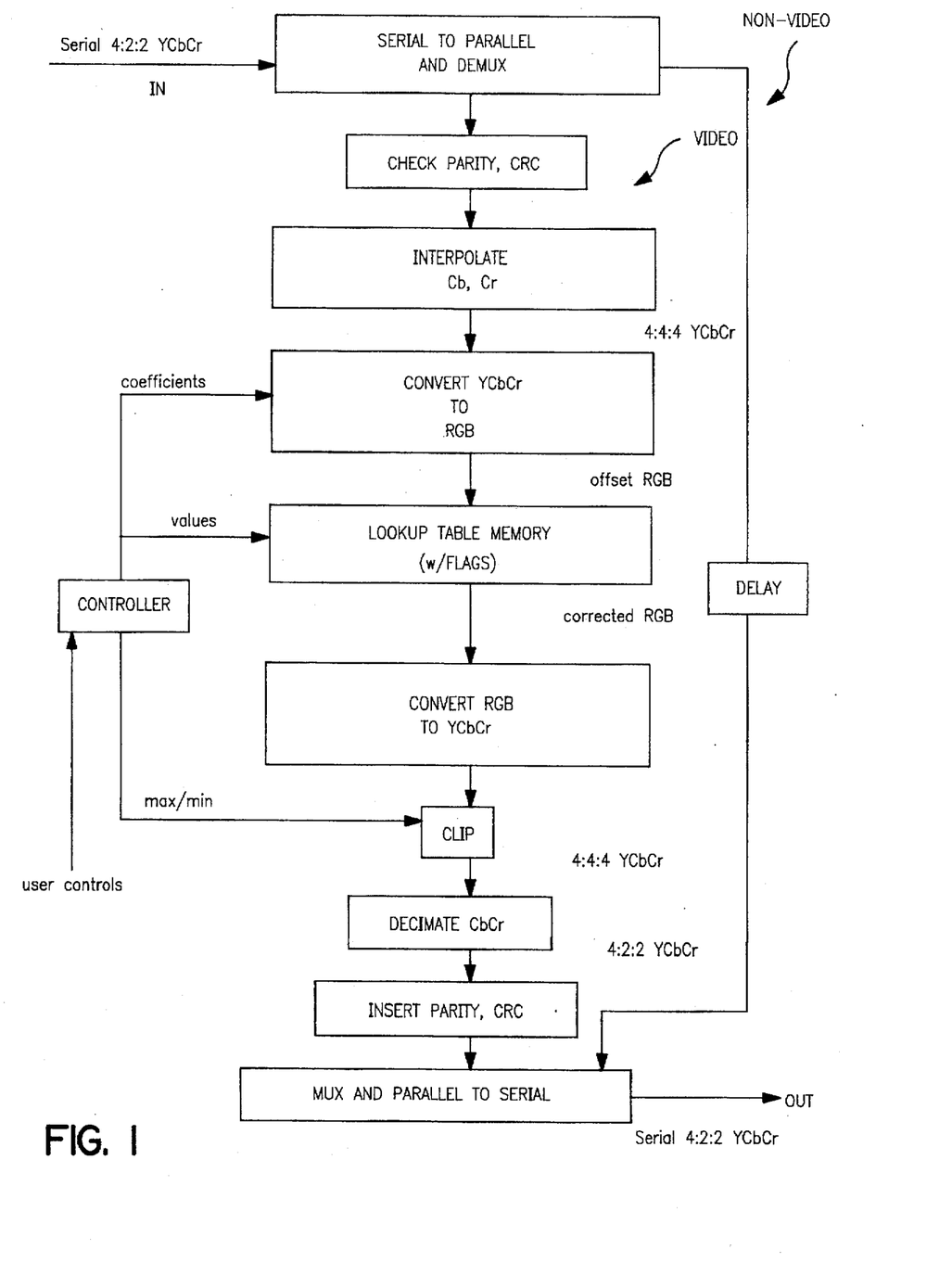
FIG. 1 is a functional block diagram illustrating operation of the digital converter or corrector according to the invention.
Figure 2:
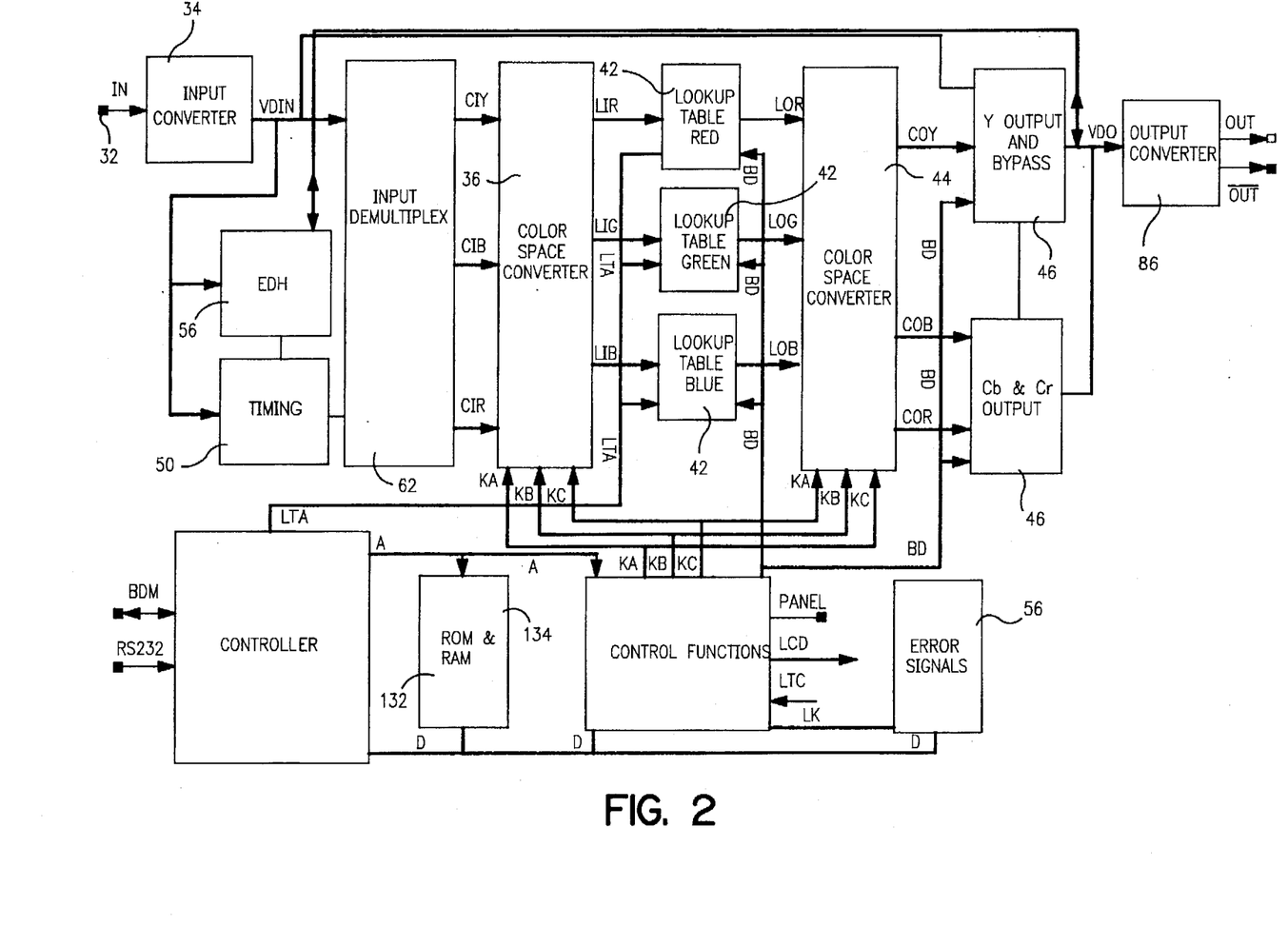
FIG. 2 is a structural block diagram thereof.

A summary of the apparatus can be appreciated with reference to the functional block diagram in FIG. 1 and the structural block diagram in FIG. 2. Serial digital data at input 32 is first converted to parallel data VDIN at input converter 34. Provided the data represents video, as determined from the timing and synchronization codes contained in the data, it is demultiplexed into separate Y, Cb and Cr paths, each of which is ten bits wide. Data at VDIN that does not represent video bypasses the converter except that such data is delayed by a time equal to the processing delay of video data through the apparatus.

The data in CCIR-601 format includes two luminance samples Y for each complete color difference sample CbCr. The data is converted from this 4:2:2 format to 4:4:4 by interpolating between color difference samples in an input demultiplexer 62, e.g., by using each color difference CbCr for two successive luminance values Y, by inserting the average of two successive color difference samples Cb or Cr between them, or preferably by inserting a weighted average of a predetermined number of samples using a half band filter. Thus, the same number of Y, Cb and Cr samples are provided at the output busses CIY, CIB and CIR on input demultiplexer 62.

The samples are applied as 12-bit inputs to an input color space converter 36, such as a Raytheon TMC2272 color space converter, which performs a three by three matrix multiplication with 10-bit coefficients KA, KB, KC, that can be adjusted by the user under control of a microcontroller 40. The resulting RGB data on busses LIR, LIG, LIB is used to address lookup tables or memories 42 that are loaded by microcontroller 40, which can apply linear or piecewise non-linear corrections such as general changes in the transfer function or gamma curve, stretches (slope changes) at high or low levels, and threshold clips. The output lookup table memory contents LOR, LOG, LOB at the addressed memory locations represent corrected RGB data. The data values are applied as inputs to a second color space converter 44 that uses fixed coefficients KA, KB, KC from the same bus in a matrix multiplication to change back to YCbCr format at outputs COY, COB, COR. A final set of limiters 46 apply clip values in YCbCr color space. The resulting data is decimated, for example by removing every second color difference sample CbCr, or by averaging two adjacent samples Cb or Cr, or preferably by using a filter for inserting a weighted average of a predetermined number of samples for converting back to 4:2:2 sampling format. Finally, the data is remultiplexed in the proper order Cb, Y, Cr, Y, Cb, Y, Cr, . . ., etc., into a single signal path and is transmitted in its original bitwise serial form for output.

Figure 3:
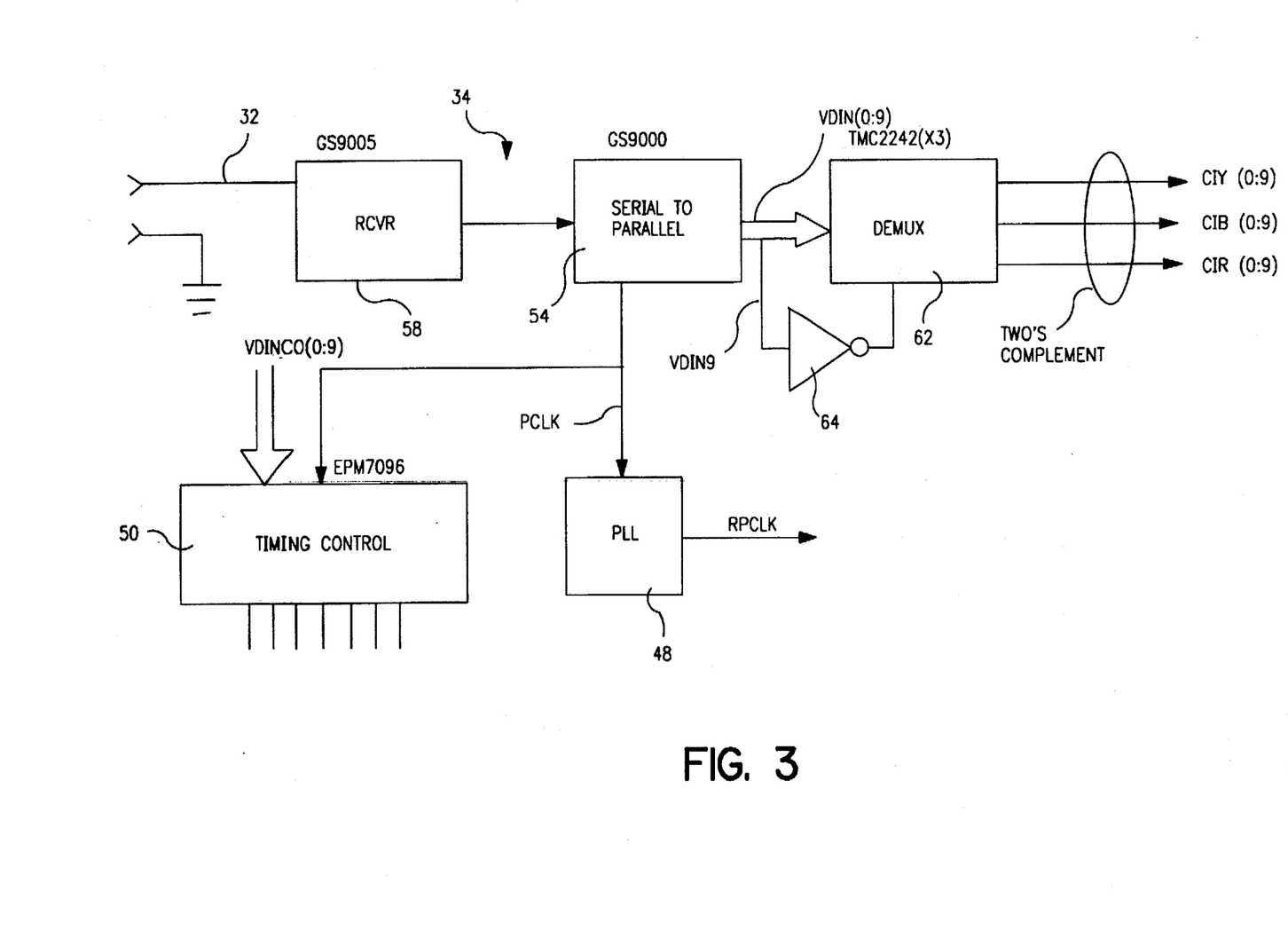
FIG. 3 is a schematic diagram showing the receiver section of a preferred embodiment of the digital converter or corrector.

Timing and control is derived from the input signal, including a 27 MHz clock signal generated from the data using a phase locked loop 48, shown in FIG. 3, that derives the clock from the incoming bit stream. Synchronization signals cause a timing controller 50 to generate triggering signals at the appropriate times and phases to advance the data from element to element along the pipelined data path. An input serial to parallel converter 54 produces three ten bit data words that are processed as parallel words at 27 MHz. The timing control block 50 also functions in conjunction with control signals from microcontroller 40 and an error detection and handling (EDH) block 56.

The serial digital converter or corrector of the invention provides the user with a plurality of choices for modifying parameters including hue shift, gain of any combination of components in RGB or YCbCr space, offset (or brightness) of any components or combination of components in RGB or YCbCr space, white clip to any combination of components in RGB or YCbCr space, black clip to any combination of components in RGB or YCbCr space, white slope to any combination of components in RGB space, black stretch to any combination of components in RGB space and adjustment of the gamma function of any combination of components in RGB space.

These corrections and modifications permit a form of video editing that allows the user to make various alterations in a video program. For technical reasons it may be desirable to equalize the video characteristics of a signal from one source with a signal from another source, or to correct the video characteristics according to some standard. The invention also makes it possible to make artistic adjustments in how a scene will appear. For example, an editor may wish to deepen shade in an outdoor scene to deemphasize a feature, or reduce shade to better reveal the shaded area. A scene with greenery can have its foliage appear brighter or darker or adjusted as to color. Earth tones similarly can be played up or down. Similar changes can be made by adjusting black or white stretches (i.e., changing the gain through the device at the extremes of luminance), as well as by generally adjusting the gain, shape, gamma correction, or offset of the transfer function.

In addition to making changes in the luminance and color difference values or the RGB values, according to further aspects the invention provides various status information and alarms, as well as supporting error detection and handling codes produced by other devices or used by other devices. The invention carries through error detection flags inserted by previous equipment along the signal path and also provides new parity and cyclic redundancy checking information consistent with the modified output signal. The unit counts and automatically detects lines per frame of 525 or 625, a wrong number of data words in active video, a wrong number of lines in a field, detects protection bits errors in the embedded timing reference codes, illegal input sample data, and/or an input coordinate that does not map to a valid RGB coordinate. These conditions can be signalled over a separate communication channel, and/or by front panel messages. The device also limits the output level, if desired, to within high/low limits by clipping the output at legal levels.

The input converter section is shown in more detail in FIG. 3. The serial digital video data at 270 Mbit/sec conforming to the 4:2:2 sampling specification of CCIR-601 is coupled to the unit at a BNC connector input 32 and converted from a bit-serial data stream to 10 bit parallel digital video data words at 27 Mword/sec using an industry standard chip set (Germurn GS9000/GS9005), having a data receiver 58 and a serial to parallel converter 54. The regenerated clock signal PCLK and a ten bit parallel data bus signal VDIN are extracted. The VDIN digital data bus and clock signal PCLK are coupled to an EPM7096 programmable logic device or PLD 50, which extracts and/or generates a variety of timing and control signals from the video data. These signals control the separation of the video data into its components values Y, Cb and Cr, clock the component values through the various operations, manage the reassembly of the components back into a serial stream at the output, perform error and range checking functions, and supervise the error detection and handling process. This is accomplished by detecting and employing timing reference signals that are embedded in the data stream, for example to indicate horizontal lines, to delineate the vertical blanking interval, etc.

Regenerated clock signal PCLK is coupled to a phase locked loop 48 having a 27 MHz voltage controlled oscillator controlled by a phase comparator having a low pass filtered output (not shown in detail). Two divide by sixteen counters divide the frequency of PCLK and RPCLK at the input to the phase comparator. Output signal RPCLK is used to drive the output of the device instead of using regenerated signal PCLK directly, which minimizes jitter.

The digital signal components on the VDIN bus are a word-serial sequence of 10 bit data words [Cb, Y, Cr, Y, Cb, Y . . ., etc.], with timing reference signals (TRS) and ancillary data (ANC) interspersed. The particulars of the timing references and ancillary data preferably are those defined by CCIR recommended standards 601 and 656, and proposed SMPTE Rec. Practice 165.

VDIN is also coupled to the error detection and handling (EDH) block 56 shown generally in FIG. 2. The error detection and handling block 56 includes input and output sections. On the input side the EDH generates parity and cyclic redundancy checking (CRC) codes as a function of received data and compares the generated codes to those embedded in the data. Any error detection flags that are set in the input signal are preserved and passed along to be reinserted into the output in the outgoing EDH packet. In addition, any data that are not active video samples are routed through the bypass path, which has a delay equal to the processing delay of the active video processing path. The Y, Cb and Cr components also can be monitored for adherence to maximum and minimum signal levels as prescribed by CCIR-601.

Whereas the data are to be changed during processing through the device, on the output side of EDH block 56 new parity and CRC codes are generated at the end of the process and inserted into the signal at the appropriate time. The input side and output side error detection and handling circuits can each comprise a PLSI1024 and PLSI1016 IC, operated based on triggering signals from timing circuit 50.

In the input demultiplexer 62, the VDIN digital data is latched sequentially into one of three latches for the luminance and color difference signals, respectively. However, new luminance values occur at 13.5 MHz and new Cb or Cr values occur at 6.75 MHz. The input demultiplexer can comprise interpolating half band filters for the color difference signals, for example using Raytheon TMC2242 circuits, that perform a digital low pass filter operation and insert the result between the received Cb and Cr samples, thereby providing a 13.5 MHz output sampled at 4:4:4, i.e., triplet YCbCr samples at four times the subcarrier frequency, wherein each Y value has a co-sited Cb and Cr value. Alternatively, each color difference sample can be used twice.

As shown in FIG. 3, the most significant bit (MSB) of VDIN is coupled through input demultiplexer 62 using an inverter 64. Accordingly the stored data is converted into signed two's complement form. It is an aspect of the invention that the Y luminance signal is converted to two's complement form, as are the color difference signals. Processing Cb and Cr signals in two's complement form is not surprising because color difference is in fact centered around zero. The luminance Y component, however, varies between a minimum (x'00 being reserved for signalling) and a positive maximum. Converting the Y signal to two's complement format as well has the advantageous result that the full quantization range is made available for providing better resolution in the operation of subsequent computations using color space converters 36, 44. A substantial offset is introduced between the data value and the variable it represents, but this can be cancelled later as will be explained below.

To maintain timing of the Y signal with the color differences, the Y signal is passed through a delay in the input demultiplexer, for example using an HSP9501 programmable data buffer set to the same pipeline delay as the interpolating filters in the Cb and Cr paths. This maintains the synchronism of the three components, assuring that the parallel set of Y, Cb, and Cr values represent a video sample that originated at a discrete point in time, in a 4:4:4 sampling format. The luminance and color difference samples on data busses CIY, CIB and CIR are input to an input color space converter 36 as shown in FIG. 4, for converting the YCbCr samples to offset RGB samples.

As mentioned above, YCbCr data can be converted to RGB data according to known coefficients. According to a further inventive aspect, variable coefficients for converting from YCbCr to RGB are provided by system controller 40 via busses KA, KB, KC. The coefficients either can be varied at this point or used to make a conventional conversion. The conversion is accomplished using a Raytheon TMC2272 color space converter. This device performs a 3×3 matrix multiplication with ten bit coefficients, producing three twelve bit outputs, each of which represents a combination of the three inputs. Nine coefficients are used in the operation, provided over busses KA, KB, KC, from the system control block, responsive to the system microcontroller 40. The YCbCr data is convened to RGB. The three RGB output values LIR, LIG, LIB are then used to address lookup table memories 42 as shown in FIG. 4.

Standard matrix coefficients for YCbCr to RGB translation are known, for example from the Raytheon databook and Video Demystified: A Handbook for the Digital Engineer, High Text Publications, 1993. If the input Y signal simply had been corrected for the CCIR-601 encoding offset (namely 16) instead of being converted to two's complement format as above, multiplying by the standard matrix would produce points in an RGB space where the nominal range of R, G, and B signals would be from zero to some positive maximum value, the particular value representing the comparative luminance of each respective color R, G or B. Applying no correction to the Y signal offsets the R, G, and B coordinates by a value determined by the matrix coefficients, as described in the Raytheon 1994 databook, p. 2–181. The TMC2272 color space converter handles the matrix multiplication numerically, and is insensitive to sign. By using two's complement for the luminance value according to the invention, a much larger offset is produced in the RGB values, but the full quantization range is available at the output of color space converter 36. Applying the Y signal in unsigned binary would reduce the dynamic range of the translation by half.

Figure 4:
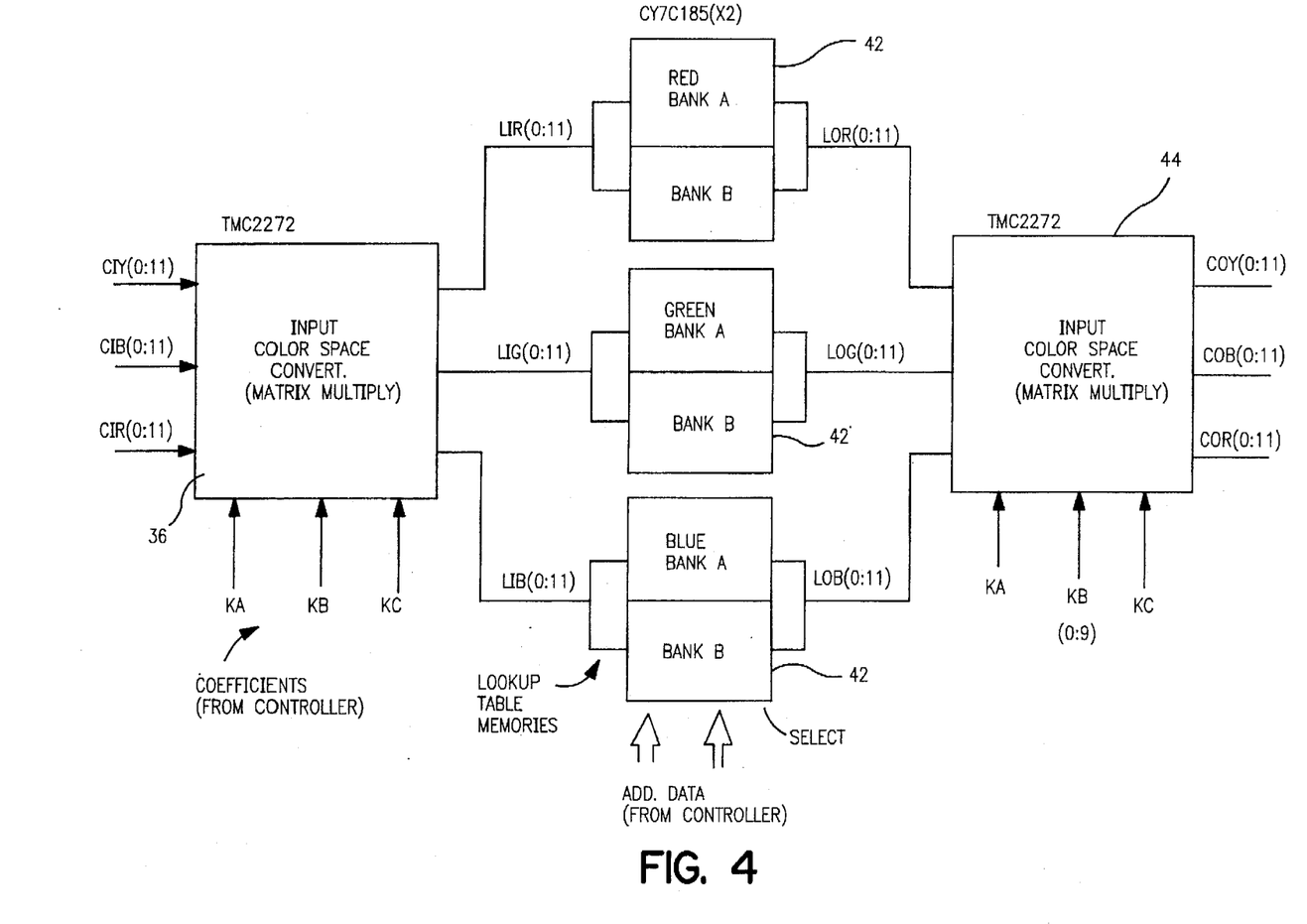
FIG. 4 is a schematic diagram proceeding along the data path from FIG. 3 and illustrating the color space converters and lookup table memories.

The output of the color space converter is not used as direct data, but rather is used to address a lookup table, and the contents of the addressed memory locations form the corrected RGB outputs LOR, LOG, LOB in FIG. 4. By programming adjustments of the nine conversion coefficients applied to the input color space converter, many parameters of the video signal may be manipulated, including the gain of any combination of Y, Cb, Cr, since these signals are the inputs to converter 36. Likewise the gain of any combination of R, G, B may be adjusted by choice of conversion coefficients, since these signals are the outputs of converter 36. The hue of the signal may be adjusted through full 360 degrees by multiplying Cb and Cr coefficients by trigonometric functions of the desired hue shift. *Video Demystified* describes a fixed vector rotation to convert YUV to YIQ, however according to the invention a continuously variable hue shift can be obtained.

The color space conversion performs the following matrix multiplication:

$$\begin{bmatrix} Kyr & Kur & Kvr \\ Kyb & Kug & Kvg \\ Kyb & Kub & Kvb \end{bmatrix} * \begin{bmatrix} Y \\ Cr \\ Cb \end{bmatrix} = \begin{bmatrix} R \\ G \\ B \end{bmatrix}$$

The matrix coefficients are computed using the following equations:

Kyr=KyrNominal * YGain * RGain

Kyg=KygNominal * YGain * GGain

Kyb=KybNominal * YGain * BGain

Kur=RGain * (KurNominal * CbGain * cos(HueShift)−KvrNominal * CrGain * sin(HueShift))

Kug=GGain * (KugNominal * CbGain * cos(HueShift)−KvgNominal * CrGain * sin(HueShift))

Kub=BGain * (KubNominal * CbGain * cos(HueShift)−KvbNominal * CrGain * sin(HueShift))

Kvr=RGain * (KurNominal * CbGain * sin(HueShift)+KvrNominal * CrGain * cos(HueShift))

Kvg=GGain * (KugNominal * CbGain * sin(HueShift)+KvgNominal * CrGain * cos(HueShifi))

Kvb=BGain * (KubNominal * CbGain * sin(HueShift)+KvbNominal * CrGain * cos(HueShift))

The outputs of the color space converter, which are nominally R, G and B, are coupled to address a respective one of three lookup tables 42, which comprise static RAMs. At each addressable memory location an output data value is stored by system controller 40 as the appropriate output for an input value equal to the address. The controller 40 adjusts the stored values under control of user inputs. In this manner, non-linear conversions are accomplished, including gamma correction in controllable amounts for any combination of the R, G, and B signals, using a piece-wise linear approximation to the gamma correction function. This permits changes to the slope of the transfer function at a limited range of inputs or outputs, if desired, such as at the extremes of luminance. R, G, and B offsets may be applied directly. Offsets desired in the YCbCr space are translated to RGB algebraically, by performing the matrix multiplication described above using the desired offsets at the input. The lookup tables permit additional offsets to R, G, and B. Whim clips (maximum signal level) and black clips (minimum signal level) may be applied to the R, G, and B components, as well as white stretch and black slope.

The data stored in sequential lookup table addresses varies generally with the value of the address at which it was stored (i.e., higher addresses contain higher values), except corrections are applied as desired. When no correction is applied, the stored values vary linearly with their addresses. The lookup tables are loaded by system controller 40 and the stored values are changed when corresponding user commands at the system inputs so dictate.

This requires that the addressing and data input/output lines of lookup tables 42 be accessible to controller 40, as shown in FIG. 2 by busses LTA for addressing the memories and BD for loading them. In order to program the lookup tables for quick response to new requirements, at least two banks of RAMs preferably are provided, one being available for programming while the other is in service as the active lookup table. Switching between banks can be restricted to occur during the vertical interval, when active video is not being used to address lookup tables 42. In addition, various images of the lookup table memory contents can be stored in the microcontroller's memory or elsewhere, for example to reset to default values or to resume a set of parameters that the user has previously set up and stored.

For writing to lookup tables 42, the inactive bank is selected and the RAMs in that bank are addressed using bus switches coupled to the LTA bus and in turn coupled to microcontroller 40. At the same time, the active bank for each of R, B and G is being addressed with the output of input color space converter 36. The active data output from the lookup table RAMs is passed through bus switches to provide three inputs LOR, LOG, LOB to the output color space converter 44 that will convert them back to YCbCr.

Lookup tables 42 employ 8K by 8 bit RAM chips, each bank having two chips to provide storage for 8192 16-bit words. However, 12-bits can only address 4096 words. The memories thus have two sections of lookup table RAM available. A signal from controller 40 determines which section is accessed. Additionally, the 12-bit data stored in the lookup tables leaves four bits available. These bits can be used as flags. For example, manipulation of a valid YCbCr coordinate can result in an RGB coordinate that is outside of valid RGB color space (prior to the application of any clips). The controller can test for this condition and set one of the "unused" bits in the look-up table when a computed R, G, or B component at that address exceeds the nominal range of the color space. When the flagged memory location is selected, this bit signals error checking circuit 56 to generate corresponding signalling in the error detection handling output data.

Referring to FIG. 4, the outputs of the RGB lookup table RAMs are coupled by data busses LOR, LOG, LOB as RGB data to inputs of output color space converter 44. The output color space converter changes the data as adjusted through the coefficients and lookup tables, back to YCbCr color space. The conversion as before is a 3×3 matrix multiplication done in two's complement form to employ the full possible dynamic range. The output conversion coefficients used are nominal coefficients and exchange back to YCbCr without manipulations at this point; however, the data carries along the changes made by the input coefficients and lookup table variations as the user has dictated.

Figure 5:
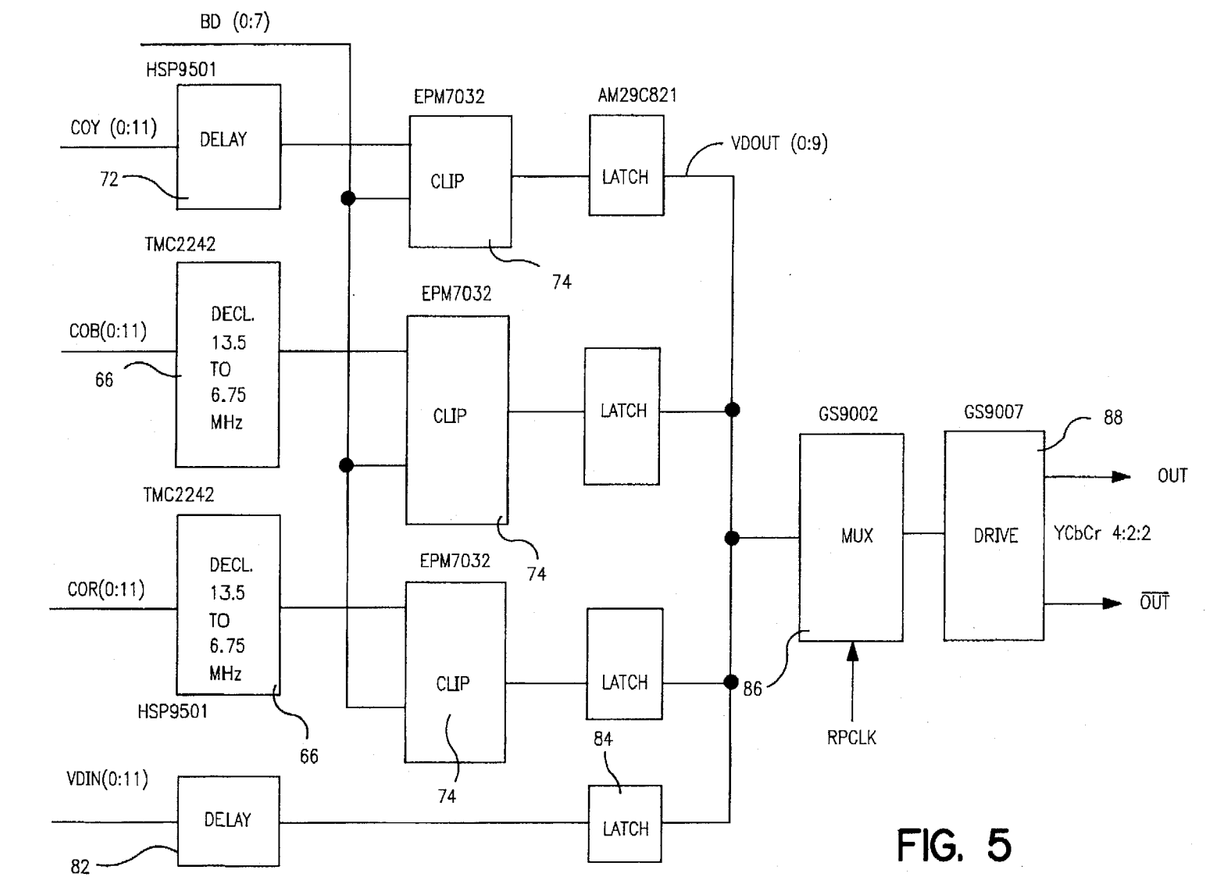
FIG. 5, proceeding from FIG. 4, shows processing elements continuing along the data path to the output.

The foregoing computations were in 4:4:4 sampling format to provide three data values at 13.5 MHz for each coincident sample during computation and lookup steps. In FIG. 5 the data are converted back to CCIR-601 4:2:2 format, with Y at 13.5 MHz and CbCr at 6.75 MHz. In addition, the data are remultiplexed into proper serial order. The Cb and Cr data are passed through decimating filters that drop every other value or average sequential Cb or Cr samples over a predetermined number of samples and insert the result. This is accomplished in two TMC2242 decimating filters 66 operated at 13.5 MHz at the input and at 6.75 MHz at the output. The Y data is delayed using an HSP9501 programmable delay line 72 set to the same delay as that introduced in decimating filters 66. The outputs of filters 66 and delay line 72 are coupled to EPM7032 programmable logic devices 74 that apply upper and lower limits to the data values. The particular upper and lower limits or clips are provided by system controller 40 over data bus BD as shown in FIG. 2. Data values that fall outside the clip limits are replaced by data values equal to the clip limits. Programmable logic device 74 also inverts the most significant bit of the data to undo the two's complement encoding initiated at the input and continued by means of offsets in RGB. The clips provide white and black limits for Y, Cb and Cr. RGB limits were applied at the lookup table, but due to the interrelationships of the factors in converting between color spaces, it is not readily possible to limit Y, Cb and Cr values when operating in RGB space.

The system input signal was not limited to video data, and also includes timing reference signals and ancillary data. Such data is coupled through a further HSP9501 programmable delay data buffer 82 that is set to provide the same processing delay as the entire sequence of active video processing discussed above. This bypass path for signals other than active picture data is selected by latching an enable signal when timing circuit 50 detects the absence of active video, and prevents any change to the timing reference signals and ancillary data while preserving their time position in the signal. Preferably, the bypass path also can be selected from the user inputs, such that all video and non-video data is simply passed through delay line 82.

The YCbCr and VDIN ancillary data are reassembled using tri-state output latches 84 having outputs enabled in the proper sequence for conversion to serial format, with the bypassed data inserted into the stream at the proper times. The YCbCr data is selected by enabling the corresponding output latches sequentially to select Cb, Y, Cr, Y, Cb, etc. A GS9002 parallel to serial converter 86 uses this data and the reconstituted phase locked clock signal RPCLK to present the bit-serial output data to a GS9007 driver stage 88 that provides two serial outputs, one being the inverted version of the other.

Figure 6:
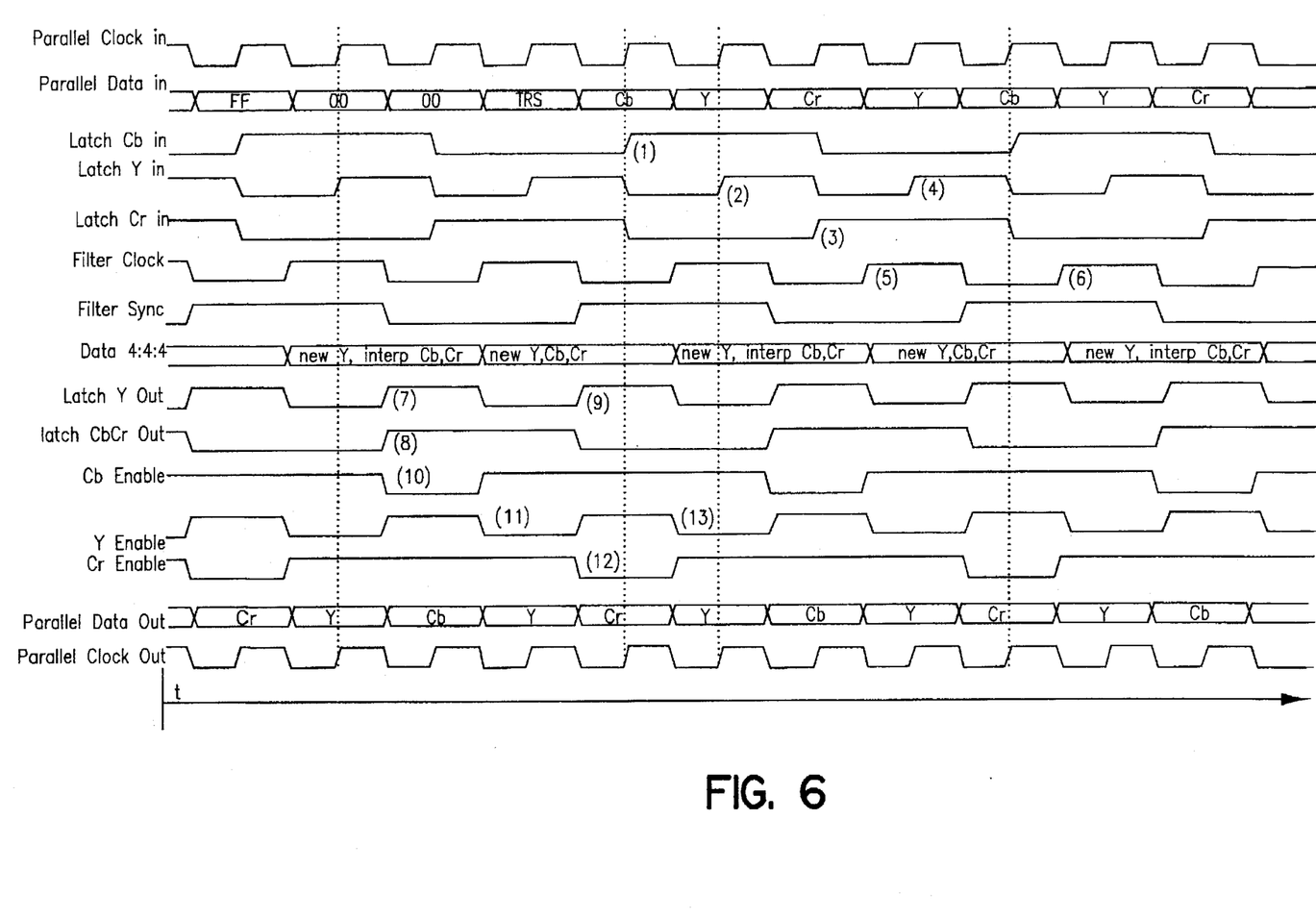
FIG. 6 is a timing diagram showing triggering signals and functions occurring in timed relationship according to FIGS. 1 and 2.

FIG. 6 shows the timing relationship of a number of the signals identified in the drawings, and in particular the block diagram of FIG. 2. The control functions block generates three latch signals from the parallel data clock, which are synchronized by processing the timing reference signal codes, and which are used to sort out the interleaved Y, Cb, and Cr data. These clock signals drive three latches. After a SAV timing reference signal code is received, the next word to arrive is a Cb sample. This sample is latched by the rising waveform at time (1). The next word is a Y value and is latched at (2). The following Cr value is latched at (3). These three words represent data for a single pixel. The set of three words is clocked into the two interpolating filters and one delay line by the rising edge of the filter clock at (5). The low value of the filter sync line at that time causes the interpolating filters to accept new data at their inputs. The next data word to arrive is a Y value, and it is latched at (4). This Y value is not accompanied by co-sited Cb and Cr values, per the CCIR-601 4:2:2 standard. The Y value is clocked into the delay line at (6). The filter sync signal is now high, and the interpolating filters do not accept new inputs, but instead generate interpolated values in their places. The result at the outputs of the interpolating filters and delay line (after a pipeline delay) is the sequence of triplets of YCbCr data, for which every other set includes the interpolated Cb and Cr data, and the data stream is in 4:4:4 format.

Input color space converter 36 is clocked synchronously with the input filters, and introduces additional pipeline delay. The computed coefficients are written to converter 36 by microcontroller 40 and control block 90 during the vertical blanking interval, so that the processing for any given video field is the same over the full field. During the vertical blanking interval, VDIN data follows the bypass path rather than the video processing path, as described.

The 16 bit lookup table RAMs 42 use 12 bits for signed binary values for RGB signals, and one additional bit for RGB range checking flags, as described previously. Changes in the active video processing path, such as changing the coefficients of color space converter 36 or the transfer function provided by the data in lookup tables 42, are made during the vertical blanking interval. The time required to reprogram a full bank of lookup tables can be longer than the vertical blanking interval, which is made possible by use of an active bank and an inactive bank of tables. The initiation of the new set of lookup table values is delayed until the next vertical blanking period after the full new set of lookup table values has been stored. Likewise, any updated color space converter coefficients are written to the converter during the vertical interval, for use beginning with the next field.

At the output of the second color space converter 44, sets of corrected video data in two's complement 4:4:4 format are produced. These are decimated back into 4:2:2 format, and reassembled into the proper sequence for serial output. At the output side of the process, the sets of converted YCbCr data are clocked into the two decimating filters 66 for Cb and Cr, and a corresponding delay line 72 for Y. The decimating filters generate new output values for the rising edge of their clock for which the filter sync control is low. The filter and delay line outputs pass through limiter circuits or filters 74, which impose the black clips (minimum value) and white clips (maximum value), and are clocked synchronously with the output delay line 72.

At the outputs of the limiter, clock signals latch the sets of data that become available after the rising edge of the filter clock. At time (7) in FIG. 6, the new value of Y is latched. At that same time, new values of Cb and Cr are available, and are simultaneously latched by the clock at (8). The next rise of the filter clock produces a new value for Y, which is latched by the clock at (9), but the Cb and Cr values are not new, because of the decimation process, and are not latched.

Delivering these latched values to the output is the function of signals that enable the latch outputs onto a common bus, at the proper time. At (10), the newly latched Cb value is enabled, and is clocked out to the output stage. At (11), the Y value associated with the Cb, which was latched at the same time, is enabled, and is clocked out. At (12), the Cr value that was co-sited with the previous Y and Cb is enabled to be clocked out. Then at (13), the Y value latched at (9), which has no associated Cb and Cr, is enabled to be clocked out. In this manner, the proper CCIR-601 sequence of data samples is restored. The bypass path output is enabled at the proper time to pass through the non-active portions of the original data stream, including horizontal and vertical blanking and any ancillary data packets.

Figure 7:
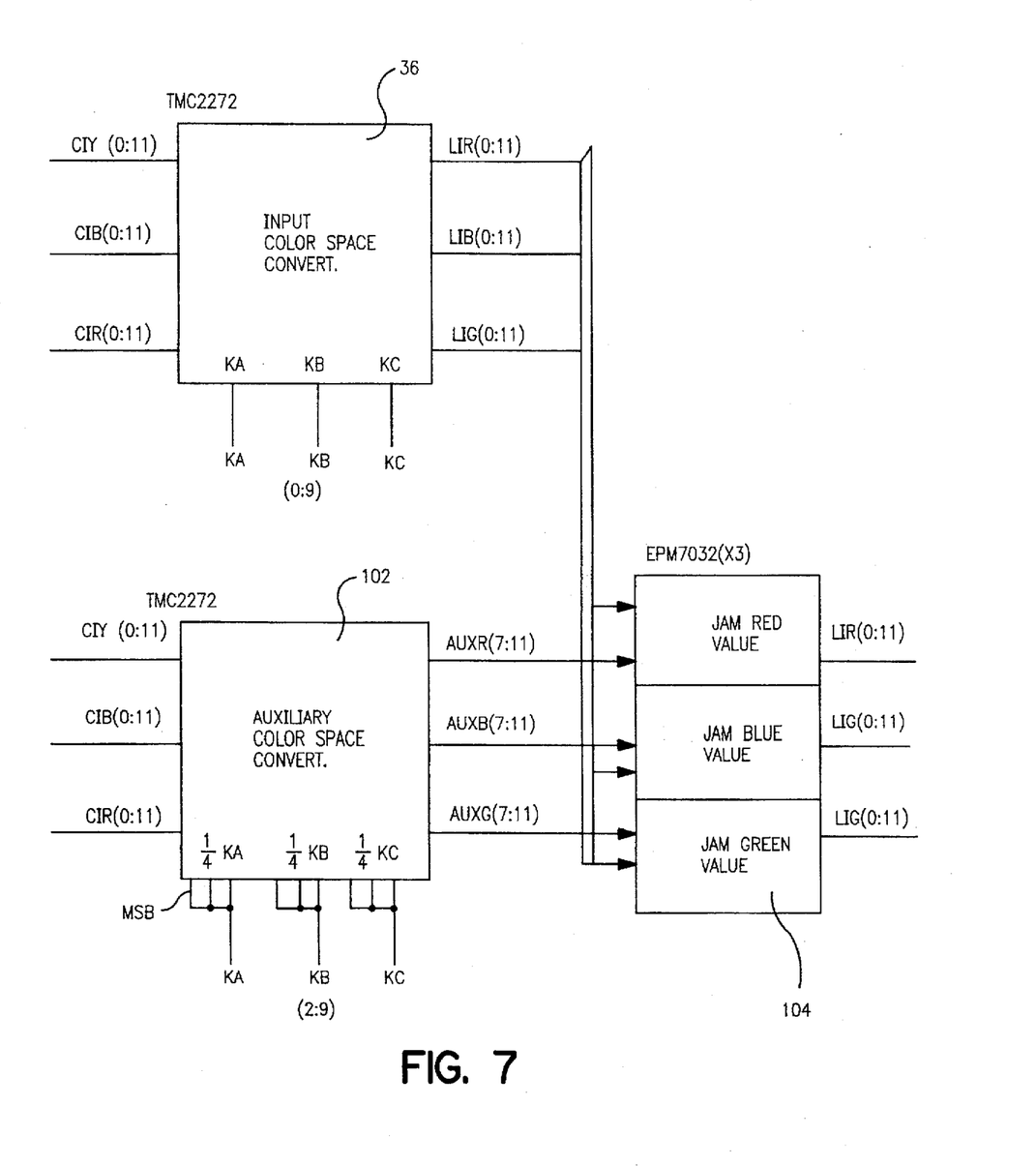
FIG. 7 is a schematic diagram illustrating an alternative embodiment of the invention.

FIG. 7 illustrates an alternative embodiment of the invention having further control of potential problems with register overflow. It is possible under some circumstances to produce an overflow in the output of input side color space converter 36. When this occurs, the sign of the output can be changed, resulting for example in a change in whites in the scene to black, and vice versa. According to the embodiment of FIG. 7, an auxiliary color space converter 102 is arranged to check for overflow and to insert limit values into the data path. Auxiliary color space converter 102 has the same input as primary input color space converter 36, except the coefficients KA, KB, KC are coupled to the auxiliary converter so as to be divided by four. This is done by coupling the most significant 8 bits of coefficients KA, KB and KC to the least significant 8 bits of the auxiliary converter inputs, and coupling the most significant bit to the remaining input MSBs for each coefficient. The result is that the coefficients are divided by four and their sign is preserved. Whereas the coefficients have been divided by four, an overflow cannot occur in the auxiliary converter.

Following a computation, the sign bits of the outputs LIR, LIB, LIG of the input color space converter are compared to those of the auxiliary converter. If the two sign bits are different, a potential overflow has occurred. However, the sign bits may also be different when an overflow has not occurred if the output data value is near zero. An EPM7032 programmable logic element 104 checks the five most significant bits of auxiliary outputs AUXR, AUXB, AUXG to determine whether the result is near zero. If the respective result is not near zero, programmable logic element 104 inserts a predetermined data value in place of output LIR, LIB or LIG, which has overflowed.

Figure 8:
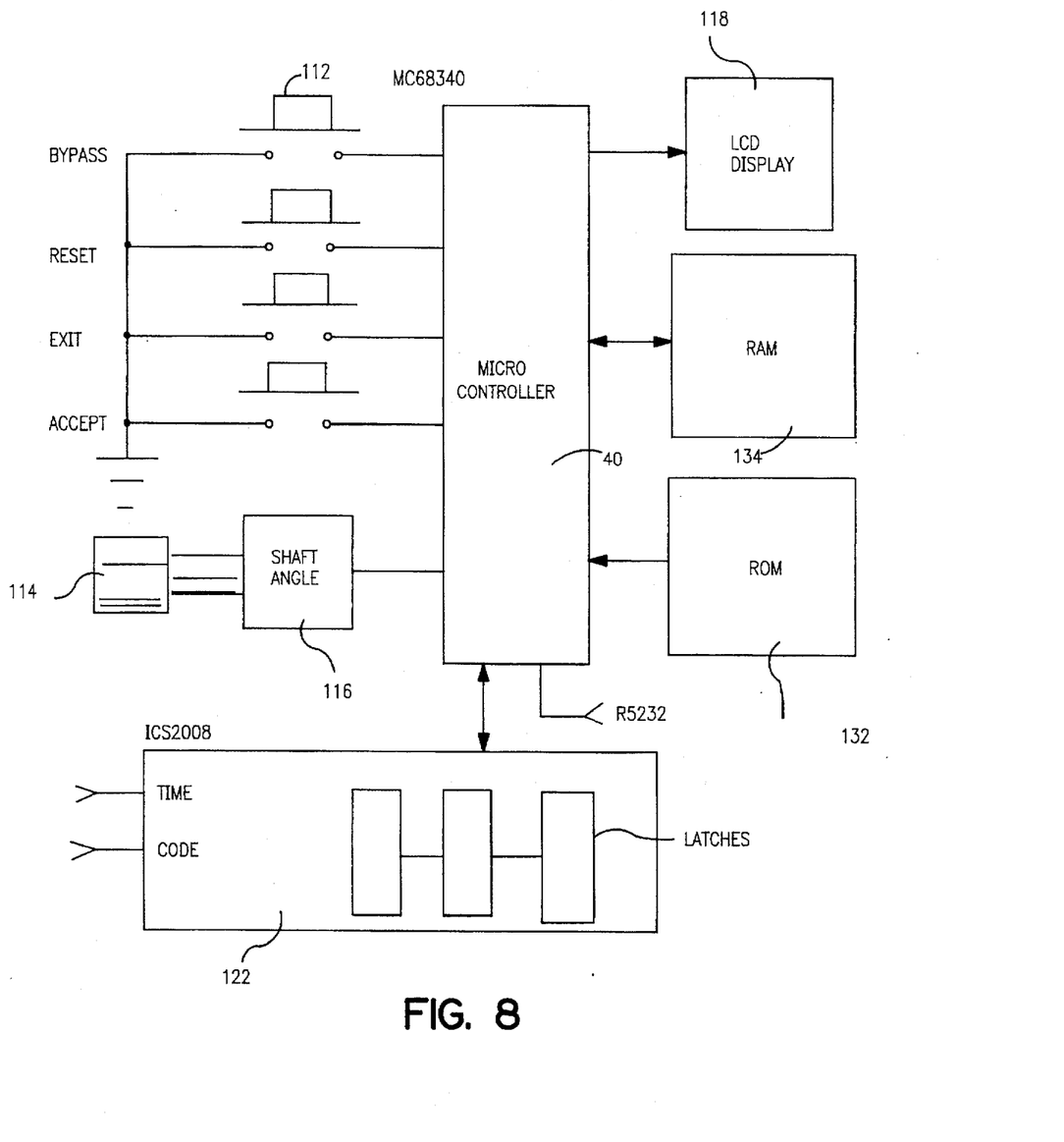
FIG. 8 is a schematic diagram illustrating the controller and timing code circuits according to the invention.

The system as shown in FIG. 2 has a system controller 40 and a control functions and timing block 90. The system controller and its user interface are generally shown in FIG. 8. The system controller calculates and loads the appropriate coefficients and lookup table factors in response to user inputs, effected by a display operable by the system controller to present menu options scrolled and selected by the user using an "accept" pushbutton 112. Switches 112 can also be provided to trigger a bypass mode, to reset one or more values, and/or to exit a menu selection. Preferably, a substantially continuous dial or wiper control 114 is provided to permit the user to vary a selected parameter over a range, while monitoring the results on a video monitor, vectorscope or other display (not shown). In the preferred embodiment, a shaft angle encoder 116 is coupled to system controller 40 through a programmable logic device (not shown) functioning to provide an up/down count or a dial position control to the system controller. The display 118 can comprise a backlighted LCD display responsive to data latched onto a buffer by the system controller.

The serial video converter of the invention is useful in a video production environment to make corrections for technical or artistic purposes. Accordingly, it is useful to provide time code processing capability, with the system controller being programmable to effect a particular change in the video signal at a particular time such as at a field corresponding to a change of scene. An ICS2008 time code processor chip 122 is provided for this purpose. The chip has its own crystal clock and can process a linear time code signal from a signal coupled to a rear panel connector. The system controller reads and writes to registers within the time code processor 122, and is interrupted by processor 122 when a new time code is available, such that predetermined sets of coefficient and lookup table values can be activated at a particular time or for a particular number of frames, etc.

The control and timing block 90 generates the required triggering signals to enable the respective circuit elements at the appropriate times in a coordinated manner. In a preferred embodiment system controller 40 is an MC68340 microcontroller. The system controller clocks include a 32 kHz crystal clock, and serial communications depend on a 3.7 MHz crystal clock. An RS-232 serial interface is provided for communications with microcontroller 40, for example for loading a predetermined set of coefficients and lookup table data values from an external computer (not shown), or for remote monitoring of detected errors.

The memory of the system controller includes 256K bytes of ROM 132 for nonvolatile firmware, and 128K bytes of RAM 134. An 8K byte backup RAM (not shown) is provided for holding system status information when the power is off, and has a large capacitor to render the backup memory nonvolatile at least for a time after power is switched off. The contents of the backup memory can be used to re-initiate previous coefficients and lookup table values upon power up. Alternatively, default values can be initiated by operating the reset pushbutton, for example to start up after reset with the system set to pass through a video signal unchanged from the input to output.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A digital converter for an input video data signal having successive samples of at least three data values representing luminance and hue information defining the samples according to a first color space definition, the converter comprising:

at least two color space converters in cascade along a data path between a data input and a data output, a first said color space converter being operable to convert successive sets of the data values from the first color space definition to a second color space definition, the first color space converter being operable to perform a numeric function on the successive sets of the data values using first factors applicable to the data values, and a second said color space converter being operable to convert successive sets of the data back to the first color space definition, the second color space converter being operable to perform a numeric function on the successive sets of the data values using second factors applicable to the data values;

at least one value adjustment circuit operable to perform a numeric function on the successive sets of the data values using third factors applicable to the data values, the adjustment circuit being coupled to at least one of the two color space converters for performing the numeric function using the third factors to correct the data values in at least one of the color space definitions; and, a controller in data communication with the at least one value adjustment circuit, the first and second color space converters and an input, the controller being responsive to signals on the input to control the numeric function effected by the adjustment circuit for altering the luminance and color difference information contained in the data values, and wherein the data values have a gain and an offset and the controller is operable to adjust at least one of the first, second and third factors in order to adjust at least one of the gain and offset of the data values as the successive samples pass through the converter.

2. The digital converter of claim 1, wherein the successive samples comprise bit serial words at the data input, further comprising a serial to parallel converter and a demultiplexer for converting the successive samples to bit parallel, word serial form.

3. The digital converter of claim 1, wherein the adjustment circuit comprises at least one clipping filter coupled to an output of the second color space converter, the clipping filter imposing at least one of a maximum and a minimum value on the data values.

4. The digital converter of claim 1, wherein the successive samples comprise bit serial words at the data input and the data output according to a YCbCr luminance and color difference color space definition, further comprising a serial to parallel converter and a demultiplexer coupled between the data input and the first color space converter for converting the successive samples to bit parallel, word serial form at an input to the first color space converter, and a parallel to serial converter and remultiplexer coupled between the second color space converter and the data output, and wherein the third factors are variable coefficients and the adjustment circuit is responsive to the variable coefficients provided to the adjustment circuit by the controller.

5. The digital converter of claim 4, further comprising at least one lookup table memory containing data values loaded by the controller into addressable memory locations, the lookup table memory being coupled between an output of the first color space converter and an input of the second color space converter such that an output of the first color space converter addresses memory locations in the lookup table memory and applies contents of the memory locations to an input of the second color space converter.

6. The digital converter of claim 5, wherein the adjustment circuit further comprises at least one clipping filter coupled to an output of the second color space converter, the clipping filter imposing at least one of a maximum and a minimum value on the data values.

7. The digital converter of claim 1, wherein the input video data signal includes sample data values representing active video data and also signalling codes in addition to the sample data values, and further comprising a control circuit operable to detect the signalling codes and a bypass datapath enabled by the control circuit for passing the signalling codes around the color space converters and the adjustment circuit, the bypass datapath having a delay equal to a processing delay of the active video data.

8. The digital converter of claim 1, wherein the successive samples comprise 4:2:2 sampled YCbCr luminance and color difference values, and further comprising means operable to provide color difference values CbCr at twice a rate of sampling thereof, prior to performing the numeric function, for each luminance sample, whereby the YCbCr luminance and color difference values are processed at a 4:4:4 sample rate.

9. The digital converter of claim 8, wherein the means for doubling samples of the color difference values comprises an interpolating filter operable to insert an average of a predetermined number of successive color difference values Cr, Cb between samples thereof.

10. The digital converter of claim 9, further comprising a decimating filter operable to reduce the number of CbCr color difference values to reconvert the values to a 4:2:2 sampling rate.

11. The digital converter of claim 1, wherein the successive samples are provided at the input according to a YCbCr luminance and color difference color space definition, wherein the adjustment circuit includes a matrix multiplier operable to multiply the data values by coefficients provided to the adjustment circuit by the controller, and wherein each of the YCbCr components are applied to the matrix multiplier in a two's complement form, and wherein the Y component of the luminance and color difference is artificially offset to provide approximately equal distribution of allowable values above and below zero, whereby outputs of the matrix multiplier range substantially through a full dynamic quantization span in a variably offset translation of an RGB color space definition.

12. The digital converter of claim 11, further comprising at least one auxiliary color space converter, the auxiliary color space converter being arranged to perform the numeric function using reduced values of one of the data values and the factors, and further comprising means for comparing an output of the auxiliary color space converter and one of the first and second color space converters, and generating an overflow code when said one of the first and second color space converters produces an output having a sign different from a sign of the output of the auxiliary color space converter.

13. A digital converter for an input video data signal having successive samples of at least three data values representing luminance and hue information defining the samples according to a first color space definition, the converter comprising:

at least two color space converters in cascade along a data path between a data input and a data output, a first said color space converter being operable to convert successive sets of the data values from the first color space definition to a second color space definition, and a second said color space converter being operable to convert successive sets of the data back to the first color space definition;

at least one value adjustment circuit operable to perform a numeric function on the successive sets of the data values using coefficients applicable to the data values, the adjustment circuit being coupled to at least one of the two color space converters for performing the numeric function to correct the data values in at least one of the color space definitions;

a controller coupled to the at least one value adjustment circuit and to an input, the controller being responsive to signals on the input to control the numeric function effected by the adjustment circuit for altering the luminance and color difference information contained in the data values; and, wherein the successive samples are provided at the input according to a YCbCr luminance and color difference color space definition, wherein the adjustment circuit includes a matrix multiplier operable to multiply the data values by the coefficients provided to the adjustment circuit by the controller, and wherein each of the YCbCr components are applied to the matrix multiplier in a two's complement form, and wherein the Y component of the luminance and color difference is artificially offset to provide approximately equal distribution of allowable values above and below zero, whereby outputs of the matrix multiplier range substantially through a full dynamic quantization span in a variably offset translation of an RGB color space definition.

14. A digital converter for an input video data signal having successive samples of at least three data values representing luminance and color information defining the samples according to a first color space definition, the converter comprising:

at least two color space converters in cascade along a data path between a data input and a data output, a first said color space converter being operable to convert successive sets of the data values from the first color space definition to a second color space definition, and a second said color space converter being operable to convert successive sets of the data back to the first color space definition;

at least one value adjustment circuit operable to perform a numeric function on the successive sets of the data values using factors applicable to the data values, the adjustment circuit being coupled to at least one of the two color space converters for performing the numeric function to correct the data values in at least one of the color space definitions; and, a controller coupled to the at least one value adjustment circuit and to an input, the controller being responsive to signals on the input to control the numeric function effected by the adjustment circuit for altering the luminance and color difference information contained in the data values; and, at least one auxiliary color space converter, the auxiliary color space converter being arranged to perform the numeric function using reduced values of one of the data values and the factors, and further comprising means for comparing an output of the auxiliary color space converter and one of the first and second color space converters, and generating an overflow code when said one of the first and second color space converters produces an output having a sign different from a sign of the output of the auxiliary color space converter.

15. The digital converter of claim 14, further comprising a jamming circuit responsive to the overflow code, operable to insert a predetermined value in place of the output of said one of the first and second color space converters.

* * * * *